US 6,647,770 B2

(12) United States Patent
Satish et al.

(10) Patent No.: US 6,647,770 B2
(45) Date of Patent: Nov. 18, 2003

(54) APPARATUS AND METHOD FOR TESTING INTERNAL COMBUSTION ENGINE VALVES

(75) Inventors: Mysore S. Satish, Missouri City, TX (US); Timothy E. McGreevy, Morton, IL (US); James J. Buettner, Peoria, IL (US); David A. Cusac, East Peoria, IL (US); Gregory J. Kaufmann, Metamora, IL (US); Ronald P. Maloney, Peoria, IL (US); Brian A. Cull, Metamora, IL (US); John R. Davenport, Watseka, IL (US); Burhan Hamdan, Peoria, IL (US); David E. Hackett, Washington, IL (US); Reid A. Peterson, Sparland, IL (US); Gary L. Spadin, Chillicothe, IL (US); Loren L. Randle, Hanna City, IL (US); Michael L. Lusher, Delevan, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/097,686

(22) Filed: Mar. 13, 2002

(65) Prior Publication Data

US 2003/0010103 A1 Jan. 16, 2003

Related U.S. Application Data

(63) Continuation of application No. 09/906,373, filed on Jul. 16, 2001.

(51) Int. Cl.$^7$ .............................................. G01M 15/00
(52) U.S. Cl. ..................................................... 73/119 R
(58) Field of Search ................................ 73/116, 117.2, 73/117.3, 118.1, 119 R, 118.2

(56) References Cited

U.S. PATENT DOCUMENTS

| 2,619,835 A | 12/1952 | Albaugh |
| 2,838,931 A | 6/1958 | Albaugh |
| 4,370,884 A | 2/1983 | Woss et al. |
| 4,566,310 A | 1/1986 | Cohen et al. |
| 4,854,162 A | 8/1989 | Yerace et al. |
| 5,224,512 A | 7/1993 | Nogami et al. |
| 5,421,206 A * | 6/1995 | Rohwedder .................. 73/821 |
| 5,533,384 A | 7/1996 | Pierce et al. |
| 5,625,154 A * | 4/1997 | Matsuhiro et al. ............. 73/760 |
| 6,035,707 A | 3/2000 | Main |
| 6,101,442 A | 8/2000 | Lewandowski et al. |
| 6,202,616 B1 | 3/2001 | Gracyalny |
| 6,205,850 B1 * | 3/2001 | Wehrman et al. ......... 123/90.45 |
| 6,367,321 B1 * | 4/2002 | Miyairi ..................... 73/119 R |

FOREIGN PATENT DOCUMENTS

| FR | 2 673 471 | 9/1992 |
| JP | 63-9833 | 1/1988 |
| JP | 3-13842 | 1/1991 |
| JP | 3-33409 | 2/1991 |

OTHER PUBLICATIONS

R. Lewis, et al., "Investigation of Wear Mechanisms Occurring in Passenger Car Diesel Engine Inlet Valves and Seat Inserts," (1999–01–1216) 1998 Society of Automotive Engineers, Inc. (9 pages).

* cited by examiner

*Primary Examiner*—Eric S. McCall
(74) *Attorney, Agent, or Firm*—Marshall Gerstein & Borun

(57) ABSTRACT

An apparatus for testing internal combustion engine valves is provided. The apparatus includes a housing with a bore for receiving a seat fixture. The seat fixture, in turn, receives a seat insert. A valve is inserted into the apparatus so the valve head is received at the seat insert and the valve stem extends through the seat fixture and through an axial bore in the housing. One end of the valve engages an actuating apparatus that provides a lifting action of the valve so that the valve head moves off of the seat insert as well as a rotating action to the valve. Another actuator is provided to move the valve from a lifted position to a seated position. A heater is employed to heat the valve to high temperatures to simulate extreme operating conditions. A cooling system is also provided to rapidly cool the valve and associated elements to simulate a rapid cooling condition. A method for testing internal combustion engine valves is also disclosed.

18 Claims, 3 Drawing Sheets

APPARATUS AND METHOD FOR TESTING INTERNAL COMBUSTION ENGINE VALVES

This is a continuation application of U.S. application Ser. No. 09/906,373 filed Jul. 16, 2001.

TECHNICAL FIELD

The present invention relates generally to internal combustion engines. More specifically, the present invention relates generally valves for internal combustion engines. Still more specifically, the present invention relates to an apparatus and method for testing the structural integrity and wear characteristics of internal combustion engine valves under simulated operating conditions.

BACKGROUND

Internal combustion engines include exhaust valves that control the intake of an air-fuel mixture and discharge of spent gas from the combustion chamber. Engine valves typically include a valve head connected to a valve stem. The valve stem extends from the valve head. The valve head is received on a seat disposed within the combustion chamber. The valves typically oscillate from a seated position to a lifted or unseated position inside the cylinder head.

Such engine valves are subjected to extreme heat cycles. Specifically, when a truck is climbing a steep hill, the engine is under stress and the valves become very hot, typically in the temperature range of 700 EC to 800 EC. After the truck reaches the top of a hill and proceeds downhill at a restrained speed controlled by the transmission, air flowing over the engine can cool the valve and cylinder at a dramatic pace.

In addition to these extreme heat cycles, the valve is obviously subjected to repetitive collision against the valve seat or seat insert. All of the above factors contribute to valve wear.

It has been observed that valves tend to fail in three distinct modes: radial cracking along the valve face, wear between the valve face and seat and an erosive attack that leads to guttering. Guttering tends to predominate in engines burning diesel fuel while radial cracking tends to predominate in gasoline burning engines where engine temperatures can be higher.

It has been found that guttering in diesel engines results primarily from an oxidation phenomenon along the contact face that is accelerated by the presence of deposits or contaminants. The deposits, which can strongly adhere to the valve contact face, can be formed by the combustion of additives found in the engine oil. An oxidized region of the valve face can be brittle and can erode away prematurely during the repetitive seating and lifting cycle. This guttering phenomenon can accelerate quickly until engine performance is degraded to the point of failure.

The cause of radial cracking appears to be related in part to residual stresses associated with the weld face. Because radial cracking is more common in gasoline burning engines, which typically operate at a higher temperature than diesel engines, radial cracking has been associated with high temperature fatigue of the metal. The cause of valve face to valve seat wear is especially problematic and could be solved using different alloys. However, the use of exotic alloys in manufacturing valves could be cost prohibitive.

To lower warranty costs, the use of more new materials in making valves and valve seats requires that the new materials be tested. Currently, no engine valve wear test apparatus is available which can test engine valves at extreme operating conditions in terms of temperature, pressure, valve rotation and valve offset. The present invention is directed toward overcoming these deficiencies.

SUMMARY OF THE INVENTION

The present invention satisfies the aforenoted needs by provided an apparatus for testing engine valves and a method for testing engine valves.

In one aspect of the present invention, a housing is used to simulate a cylinder. The housing has a first end and second end. The first end of the housing has an eccentric bore for receiving a seat fixture. The housing further has an axial passage that extends through the second end of the housing and into the eccentric bore. The seat fixture is replaceable and allows the apparatus to test a variety of valve sizes and configurations. The seat fixture has a first end, a second end and an axial passage extending between the first and second ends. The first end of the seat fixture is supported within the eccentric bore of the housing at the first end of the housing. The axial passage of the seat fixture is wider at the first end of the seat fixture and receives a seat insert or a valve seat at this wider section. The seat insert receives the head of the valve. The stem of the valve extends through the axial passages of the seat fixture and the housing and out the second end of the housing. The seat fixture is rotatable within the eccentric bore of the housing to provide an axial offset between the valve and the axial passage of the housing. In this manner, valves can be tested in an offset position. The valve engages at least one actuator that applies force to the valve in a first axial direction that simulates a lifting of the valve head off of the seat insert. The actuator also applies force to the valve in a second and opposite axial direction that simulates a pressing of the valve onto the seat insert.

In another aspect of the present invention, a housing having a first end and a second end is provided. The first end of the housing has a bore for receiving a seat fixture. The housing further comprises an axial passage extending through the second end of the housing and into the bore. The seat fixture has a first end and a second end in an axial passage extending between the first and second ends. The first end of the seat fixture is supported within the bore of the housing at the first end thereof. The axial passage of the seat fixture is wider at the first end of the seat fixture for receiving a seat insert. The seat insert receives the head of the valve and the stem of the valve extends through the axial passages of the seat insert and housing and out the second end of the housing. The valve engages at least one actuator for applying force to the valve in a first axial direction to simulate a lifting of the valve off of the seat insert and in a second opposite axial direction to simulate a rapid movement of the valve head downward onto the seat insert. The valve also engages a motor which rotates the valve during the cyclic seating and unseating operation. By permitting rotation of the valve during the cyclic seating and unseating, the apparatus can more accurately simulate actual operating conditions.

In another aspect of the present invention, a testing apparatus has a housing having a first end and a second end. The first end of the housing has a bore for receiving a seat fixture. The housing also comprises an axial passage extending through the second end of the housing and into the bore. The seat fixture has a first end, a second end and an axial passage extending therebetween. The first end of the seat fixture is supported within the bore of the housing and at the first end of the housing. The axial passage of the seat fixture is wider at the first end of the seat fixture where a seat insert is received. The seat insert, in turn, receives the head of the valve and the stem of the valve extends through the axial passages of both the seat fixture and the housing and out the second end of the housing. The valve is engaged by at least one actuator that applies force to the valve in a first axial direction which lifts the head or moves the head laterally off of the valve seat. The actuator also moves the valve in a second opposite direction where the head is moved into engagement with the valve seat. A motor engages the valve and rotates the valve during the cyclic seating and unseating operation. The apparatus also includes a heater for heating the valve and associated components to simulate actual operating conditions. The bore of the housing and the seat fixture define an annular gap for accommodating coolant flow for cooling the valve after the heater heats the valve to simulate a hot/cold operating condition. The coolant flow is provided by a pressurized coolant supply that passes through a variable restrictor prior to passing through the annular gap. The testing apparatus also has at least one temperature probe for measuring the temperature of the valve. The testing apparatus includes a controller linked to the actuator, motor, heater, variable resistor and temperature probe for controlling the forces applied to the valve by the actuator, the rotation imparted to the valve by the motor, the heat applied to the valve by the heater and the coolant applied to the annular gap to render an automated apparatus.

In yet another aspect of the present invention, a method for testing engine valves is disclosed. The method includes providing an apparatus having a housing having a first end and a second end. The first end of the housing has a bore for receiving a seat fixture. The housing further has an axial passage extending through the second end of the housing and into the bore. The seat fixture has a first end, a second end and an axial passage extending therebetween. The first end of the seat fixture is supported within the bore of the housing at the first end of the housing. The axial passage of the seat fixture is wider at the first end of the seat fixture where it receives a seat insert. At least one actuator is provided for applying forces to the valve in opposite axial directions. The method further includes inserting a valve into the apparatus so the head of the valve is received in the seat insert and the stem of the valve extends through the passages of the seat fixture and the housing and out the second end of the housing so that the stem of the valve and the head of the valve engage the actuator. The method further includes operating the actuator in a repeating oscillating manner so that the valve head is repeatedly lifted off of the seat insert and pressed onto the seat insert. The method further includes rotating the valve while operating the actuator. The method further includes heating the valve with a heater to a first operating temperature range while operating the at least one actuator and while rotating the valve. The method also includes cooling the valve with at least one coolant to a second operating temperature range while operating the actuator and rotating the valve.

DETAILED DESCRIPTION

Figure 1:
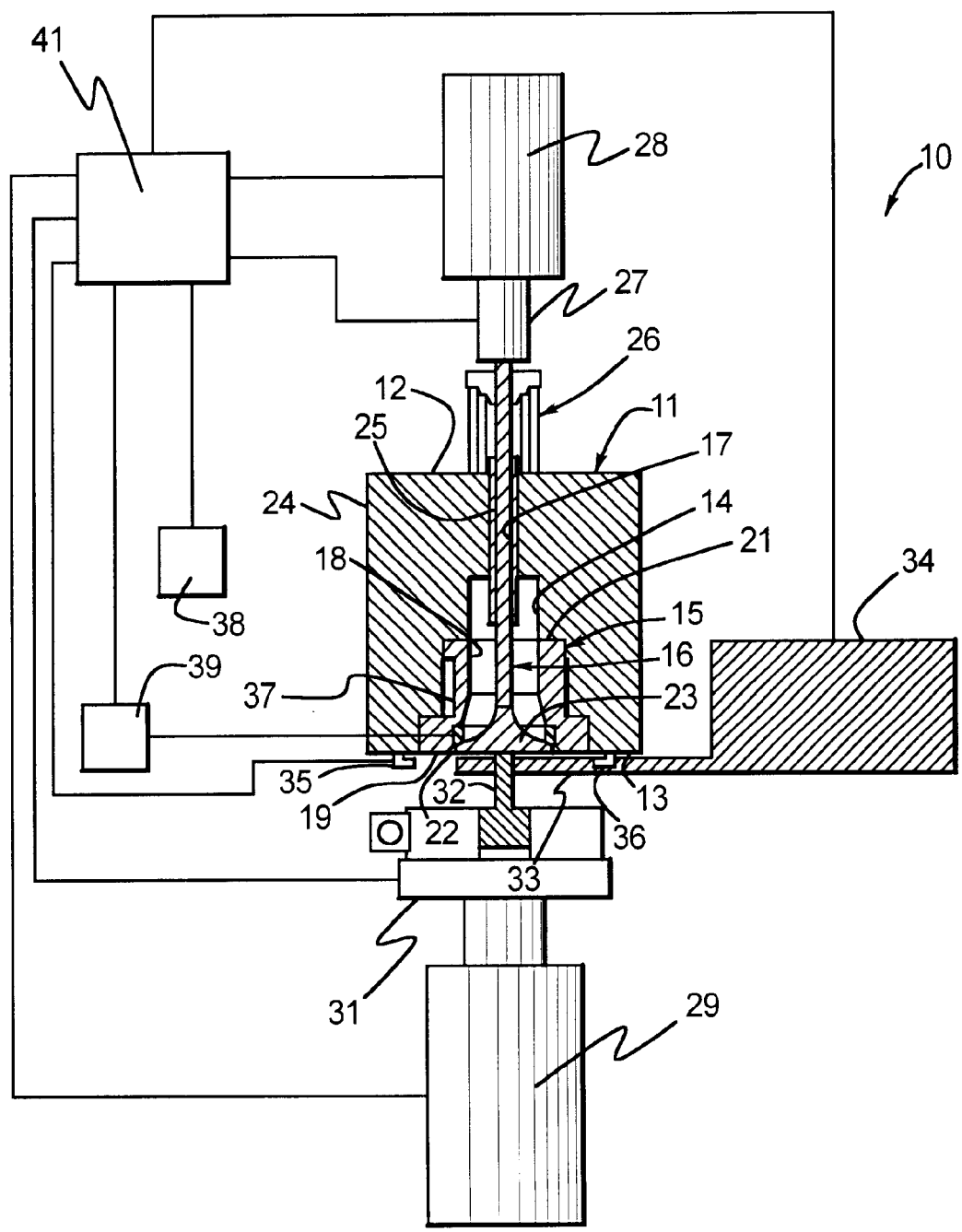
FIG. 1 is a diagrammatic plan view of a valve structure and wear test apparatus of an embodiment of the present invention.

Referring now to the FIG. 1, an engine valve structure and wear test apparatus 10 is schematically illustrated. The apparatus 10 includes a housing 11 which simulates an engine cylinder. The housing 11 includes a first end 13 and a second end 12. The first end 13 of the housing 11 includes a bore 14 which receives a seat fixture 15. Preferably, the region of the bore 14 that receives the seat fixture 15 is eccentric so that the seat fixture 15 can be rotated to offset the valve 16 with respect to the axis of the axial passage 17 that extends from the bore 14 through the second and 12 of the housing 11.

The seat fixture 15 is removable from the housing 11 and numerous seat fixtures 15 can be provided for testing a variety of valve configurations. The seat fixture 15 includes an axial passage 18 extending from a first end 19 of the seat fixture 15 to a second end 21 of the seat fixture 15. The axial passage 18 is wider towards the first end 19 of the seat fixture 15 where it accommodates a seat insert 22. The seat insert 22 receives the head 23 of the valve 16. Meanwhile, the stem 24 of the valve 16 passes through the axial passage 17 of the housing 11 and extends outward through the second end 12 of the housing 11 as shown.

More specifically, the valve stem 24 passes through a valve guide 25 and a combination spring and rotocoil assembly 26. The valve stem 24 is also engaged by a stepper motor 27 which is disposed between the valve stem 24 and an actuator 28. The actuator 28 can be a pneumatic or hydraulic cylinder to apply a force to the valve 16 resulting in a lifting the valve head off of the seat insert 22. The stepper motor 27 imparts rotation to the valve 16 during the test cycle.

Preferably, a second actuator 29 is provided to apply a force to the valve 16 resulting in the valve 16 moving from a lifted position to a position where the valve head 23 is seated on the seat insert 22. Preferably, the actuator 29 is a hydraulic cylinder but a pneumatic cylinder and other devices can be used as well. Further, it is anticipated that the actuators 28 and 29 could be combined into a single component.

The actuator 29 is connected to a load cell 31 which, in turn, engages a plunger 32 which engages the valve head 23. The plunger 32 passes through a heating element 33 of a heater 34. Preferably, the heating element 33 is an induction coil but other heating devices will be apparent to those skilled in the art and can be utilized as well. The heater and heating element 33 enables the valve 16 to be rapidly heated to simulate extreme operating conditions.

Similarly, the apparatus 10 is equipped with a cooling system to rapidly cool the valve to also simulate a rapid cooling condition. Air jets 35, 36 are provided as shown. Further, it will be noted that the seat fixture 15 and bore 14 define an annulus 37. Coolant is circulated through the annulus 37 during a cooling simulation and the flow of coolant is controlled using a variable restrictor 38. In practice, the restrictor 38 can be a valve, such as a pneumatic valve that controls the flow of coolant water or other coolant fluid.

A number of temperature probes shown schematically at 39 are utilized to monitor the temperature at or near the valve head 23. The actuator 29, load cell 31, heater 34, actuator 28, stepper motor 27, restrictor or valve 38, temperature probes 39 and air jets 35, 36 are all preferably linked to a controller 41. Thus, operation of the apparatus 10 can be automated.

In practice, the actuators 28 and 29 are controlled to generate a cyclic lifting and seating of the valve 16. A typical valve cycle is 15 Hz and the heating and cooling cycles can range from 1.5 to 3 minutes. A typical stroke for the valve 16 is 15 mm but longer strokes can be provided. A typical seating velocity provided by the actuator 29 can be 60 cm/sec. During testing, the valve is rotated by the stepper motor 27 at a rate from about 1 to about 10 rpm. The valve is preferably rotated after the head 23 has been lifted off of the seat insert 22. The heater 34, as noted above, is preferably an induction heat source that can provide from about 7.5 to about 8 kW to the valve head 23 or valve face. Valve head temperatures of 900 EC can be achieved. The actuators 28, 29 can simulate engine cylinder pressures of up to 3000 psi. A simulated peak combustion pressure on the valve face can range from 1.5 to 14 tons. The combination of the eccentric bore 14 and seat insert 15 enables an adjustable valve offset ranging from about 0 to 1 mm. One preferred controller 41 is a MTS Flex Test GT controller. Preferably, the actuator 28 is a 1-⅛ in. bore hydraulic cylinder. The heater 34 is preferably an Ameritherm 7.5 kW induction coil heating system. The valve temperature can be monitored by a Raytec infrared thermometer or a plurality thereof. One stepper motor that can be utilized is manufactured by Industrial Devices Corp. that can be provided with its own smart drive controller. A linear variable differential transformer can be utilized to monitor the motion generated by the actuators 28, 29.

Figure 2:
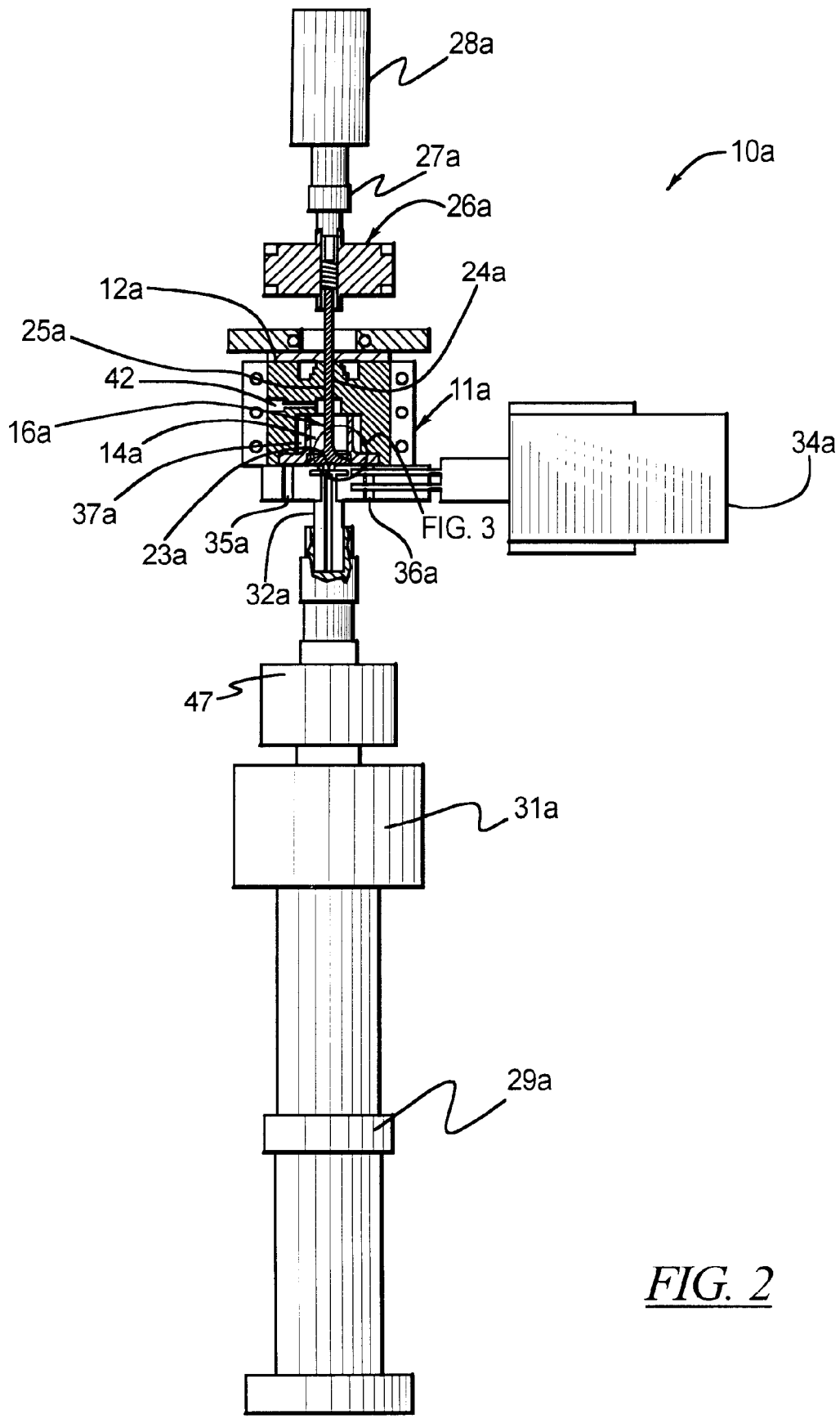
FIG. 2 is a diagrammatic plan view showing a valve structure and wear test apparatus of another embodiment of the present invention.

Turning to FIG. 2, with respect to the apparatus 10a as shown, pressure can be applied to the bore 14a through the passage 42 by a NTS 15 kip actuator, using a 40 gpm 4 port servo valve. The load cell 31 can be used to monitor the actuators 28, 29. The controller 41 can be used to control the cycle time.

An analogous apparatus 10a is shown in FIG. 2. Like numerals are used to refer to like or similar parts with the suffix "a." The connections to the controller 41 are not shown in FIG. 2.

Figure 3:
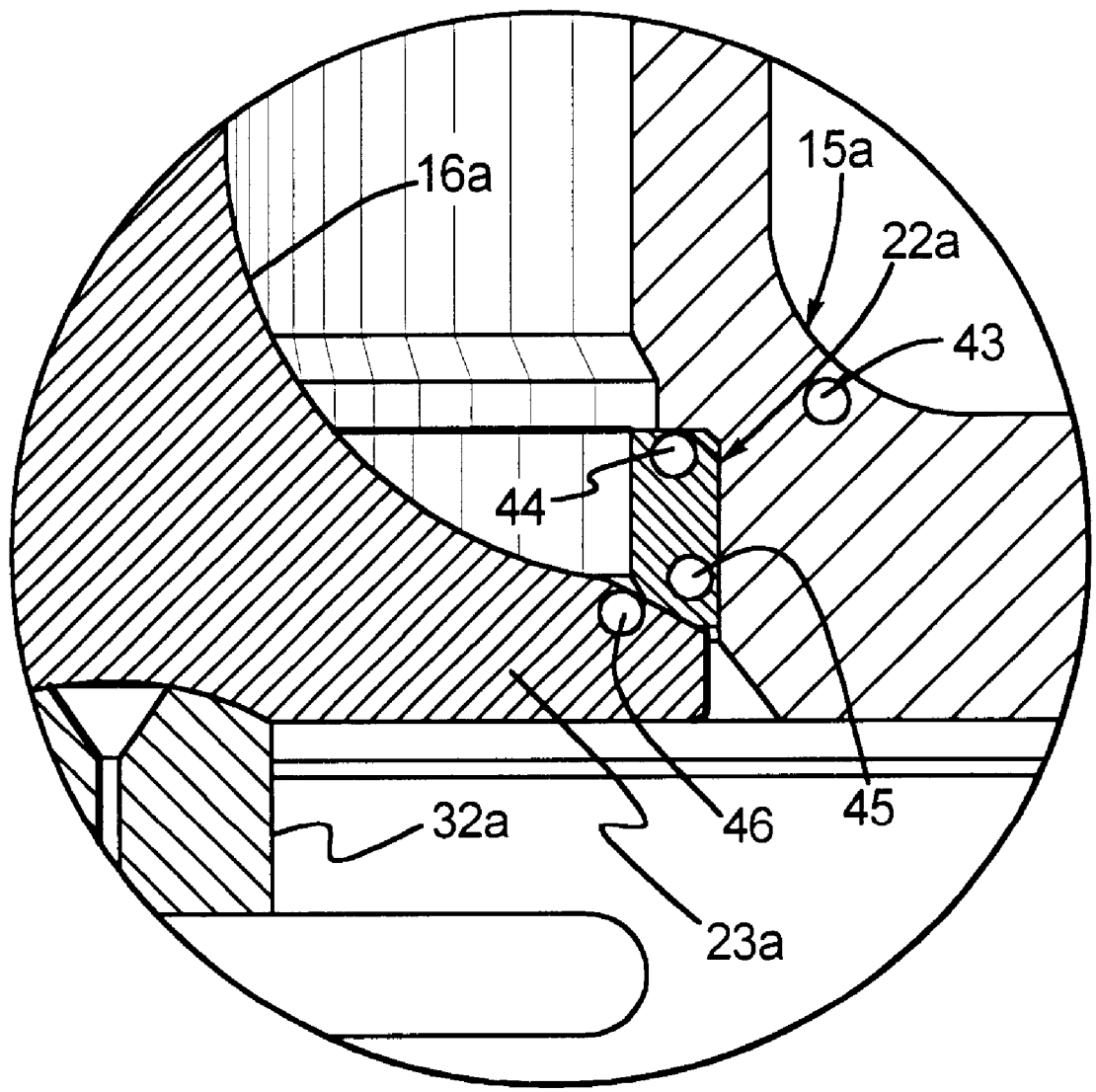
FIG. 3 is an enlarged partial view of a valve head, a seat insert and a seat fixture of the embodiment shown in FIG. 2.

Turning to FIG. 3, a plurality of thermal couples with leads 43–46 can be employed. The lead 43 is disposed in the seat fixture 15a. The leads 44, 45 are disposed in the seat insert 22a while the lead 46 is disposed in the valve head 23a.

In operation, the valve is moved in an oscillating manner at a rate of 15 Hz by the actuators 28, 29. After one third of the cycle, the liner variable differential transformer (LVDT) 47 (see FIG. 2) is set to permit a valve head movement off of the seat insert of 5 mm. At this point, the stepper motor 26 is triggered to rotate the valve. As the valve moves downward at a maximum seating velocity of 60 cm/lec, the LVDT is moved to 0 mm and the force is applied to the valve head 23 as it is seated against the seat insert 22. The heating/cooling cycle can last anywhere from 1 to 4 minutes. Initially, the heater 34 is off and coolant is flowing through the annulus 37 (see FIG. 1). The heater 34 is turned on and the supply of coolant is shut off. The coolant flow can be controlled by solenoid valves 39 which, in turn, can be controlled by the controller 41.

INDUSTRIAL APPLICABILITY

Referring to FIGS. 1–3, it is clearly evident that the apparatuses 10, 10a of the present invention can be applied to test engine valves 16 of varying dimensions under simulated operating conditions. Other applications will be apparent to those skilled in the art.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. An apparatus for testing an engine valve having a head connected to a stem, the apparatus comprising:

a housing having a first end and a second end, the first end of the housing having an eccentric bore and an axial passage extending through the second end of the housing and into the eccentric bore;

a seat fixture having a first end, a second end and an axial passage extending therebetween, the first end of the seat fixture being supported within the eccentric bore of the housing at the first end of the housing, the axial passage of the seat fixture being wider at the first end of the seat fixture than the second end;

a seat insert being adapted to receive the head of the valve, the seat insert being accommodated in the first end of the seat fixture, said stem of the valve extending through the axial passages of the seat fixture and the housing and out the second end of the housing, the valve head being received in the seat insert, said seat fixture being rotatable within the eccentric bore of the housing wherein rotation of the seat fixture within the eccentric bore results in varying an axial offset between the valve and the axial passage of the housing without removing the seat fixture or seat insert;

an actuator being adapted to engage the valve applying a force to the valve in a first axial direction from the second end of the housing towards the first end of the housing to lift the valve head off of the seat insert, said actuator also applying force to the valve in a second axial direction from the first end of the housing towards the second end of the housing and pressing the valve head onto the seat insert.

2. The apparatus of claim 1 wherein the actuator includes a first hydraulic or pneumatic cylinder for applying force to the valve in the first axial direction.

3. The apparatus of claim 2 wherein the actuator further includes one of a second hydraulic and pneumatic cylinder.

4. The apparatus of claim 1 further comprising a heater.

5. The apparatus of claim 4 wherein the heater comprises an induction work coil.

6. The apparatus of claim 4, wherein the seat fixture comprises an outer recess disposed between the first and second ends thereof, the outer recess facing the housing to define an annular gap between the seat fixture and the housing, said annular gap for accommodating a valve cooling coolant flow.

7. The apparatus of claim 4 further including a forced air cooler.

8. The apparatus of claim 5 further including a plunger that extends through the induction work coil and engages the head of the valve.

9. The apparatus of claim 3 further including a load cell disposed between the valve and one of a second hydraulic and pneumatic cylinder.

10. The apparatus of claim 1 further including:

a motor engaging the valve for rotating the valve, a heater for heating the valve, wherein the eccentric bore and seat fixture define an annular gap for accommodating coolant flow for cooling the valve, the coolant flow being provided by a pressurized coolant supply and passing through a variable restrictor prior to passing through the annular gap, at least one temperature probe for measuring a temperature of the valve, and a controller linked to the actuator, motor, heater, variable restrictor and temperature probe for controlling operation of the actuator, motor, heater and variable restrictor.

11. A method of testing an engine valve having a head connected to a stem, the method comprising:

providing an apparatus comprising, a housing comprising a first end and a second end, the first end of the housing comprising a bore for receiving a seat fixture, the housing further comprising an axial passage extending through the second end and into the bore, the seat fixture comprising a first end, a second end and an axial passage extending therebetween, the first end of the seat fixture being supported within the bore of the housing at the first end of the housing, the axial passage of the seat fixture being wider at the first end of the seat fixture for receiving a seat insert, an actuator for applying forces to the valve in a first axial direction and a second opposite axial direction, rotating the seat fixture within the eccentric bore to adjust or create an offset between an axial center of the housing and an axial center of the seat fixture, inserting a valve into the apparatus so the head of the valve is received in the seat insert and the stem of the valve extends along the axial center of the seat fixture and through the axial passages of the seat fixture and the housing and out the second end of the housing so that the stem of the valve and the head of the valve engage the actuator, operating the actuator in a repeating oscillating manner at a frequency so that the valve head is lifted off of the seat insert and pressed onto the seat insert, rotating the valve while operating the actuator, heating the valve with a heater to a first operating temperature range while operating the actuator and rotating the valve, after the heating step, cooling the valve with at least one coolant to a second operating temperature range while operating the actuator and rotating the valve.

12. The method of claim 11 wherein the actuator comprises a first hydraulic or pneumatic cylinder for applying force to the valve to lift the valve head off of the seat insert and a second hydraulic or pneumatic cylinder for applying force to the valve to press the valve head onto the seat insert.

13. The method of claim 12 wherein the rotating is accomplished with a motor engaging the valve and disposed between the housing and the first hydraulic or pneumatic cylinder.

14. The method of claim 11 wherein the heating is accomplished at least in part with an induction work coil.

15. The method of claim 11, the seat fixture comprises an outer recess disposed between the first and second ends thereof, the outer recess facing the housing to define an annular gap between the seat fixture and the housing for accommodating coolant flow for cooling the valve, the method further comprising pumping coolant through said annular gap.

16. The method of claim 11 wherein the cooling step is accomplished at least in part by a forced air cooler.

17. The method of claim 11 wherein the actuator includes a first hydraulic or pneumatic cylinder for applying force to the valve to lift the valve head off of the seat insert and a second hydraulic or pneumatic cylinder for applying force to the valve to press the valve head onto the seat insert, the second hydraulic or pneumatic cylinder engages a plunger that extends through the induction work coil and engages the head of the valve.

18. The method of claim 17 wherein the second hydraulic or pneumatic cylinder comprises a load cell.

* * * * *